United States Patent [19]

Beacom

[11] Patent Number: 5,687,997
[45] Date of Patent: Nov. 18, 1997

[54] SEALING GASKET WITH LUBRICANT RIB AND RETAINER ELEMENT

[76] Inventor: Roger Beacom, 241 Sorrento Ranches Dr., Nokomis, Fla. 34275

[21] Appl. No.: 590,689

[22] Filed: Nov. 13, 1995

Related U.S. Application Data

[63] Continuation of Ser. No. 418,261, Apr. 6, 1996, which is a continuation of Ser. No. 261,756, Jun. 17, 1994, which is a continuation of Ser. No. 83,782, Jun. 28, 1993, which is a continuation of Ser. No. 815,120, Dec. 30, 1991, abandoned.

[51] Int. Cl.$^6$ ............................. F16J 15/12; F16L 21/00
[52] U.S. Cl. ...................... 285/94; 277/207 A; 285/230; 285/231; 285/379
[58] Field of Search ............................. 285/230, 231, 285/232, 374, 379, 94; 277/207 A, 207 B

[56] References Cited

U.S. PATENT DOCUMENTS

| | | | |
|---|---|---|---|
| 2,955,322 | 10/1960 | Hite | 285/230 |
| 2,982,569 | 5/1961 | Miller | 285/230 |
| 2,996,317 | 8/1961 | Kibbie et al. | 285/231 |
| 3,298,697 | 1/1967 | Ohnstad | 285/231 |
| 3,858,912 | 1/1975 | Bower | 285/230 |
| 4,182,519 | 1/1980 | Wilson | 277/207 A |
| 4,538,822 | 9/1985 | Beacom | 277/207 A |
| 4,641,858 | 2/1987 | Roux | 285/94 |
| 4,690,414 | 9/1987 | Haaland | 285/230 |
| 4,871,180 | 10/1989 | Preisendörfer | 277/207 A |
| 4,906,010 | 3/1990 | Pickering et al. | 285/231 |
| 4,934,716 | 6/1990 | Nordin et al. | 285/231 |
| 4,946,175 | 8/1990 | Nordin et al. | 285/231 |
| 5,143,381 | 9/1992 | Temple | 277/207 A |
| 5,169,161 | 12/1992 | Jones | 285/230 |

FOREIGN PATENT DOCUMENTS

| | | | |
|---|---|---|---|
| 601314 | 7/1960 | Canada | 285/230 |
| 1207733 | 12/1965 | Germany | 285/230 |
| 1201304 | 8/1970 | United Kingdom | 285/231 |
| 1222364 | 2/1971 | United Kingdom | 285/231 |
| 1345941 | 2/1974 | United Kingdom | 285/231 |
| 2217418 | 10/1989 | United Kingdom | 285/230 |

*Primary Examiner*—Eric K. Nicholson
*Attorney, Agent, or Firm*—A. W. Fisher, III

[57] ABSTRACT

A sealing gasket and oval concrete pipe combination and method of producing the concrete pipe joint to improve the seal of the concrete pipe joint cooperatively formed between adjacent oval concrete pipes wherein the sealing gasket comprises a retainer element disposed to engage one of the adjacent oval concrete pipes to maintain the position of the sealing gasket relative to the adjacent oval concrete pipes during assembly of adjacent oval concrete pipes, a base member to aid in the alignment of adjacent oval concrete pipes during assembly and cushion adjacent portions of adjacent oval concrete pipes and a sealing element to seal the joint between adjacent oval concrete pipes and wherein each oval concrete pipe comprises a male and female joint member formed on opposite ends thereof to operatively engage the corresponding joint member formed on the next adjacent oval concrete pipe to form the joint therebetween, the male and female joint members including corresponding shaped portions to facilitate alignment and positioning of adjacent oval concrete pipes during assembly.

2 Claims, 3 Drawing Sheets

SEALING GASKET WITH LUBRICANT RIB AND RETAINER ELEMENT

CO-PENDING APPLICATION

This application is a continuation application of pending application Ser. No. 08/418,261 filed Apr. 6, 1996 which is a continuation of abandoned application Ser. No. 08/261,756 filed Jun. 17, 1994 which is a continuation application of abandoned application Ser. No. 08/083,782, filed Jun. 28, 1993 which is a continuation application of abandoned application, Ser. No. 07/815,120, filed Dec. 30, 1991.

BACKGROUND OF THE INVENTION

1. Field of the Invention

A sealing gasket and oval concrete pipe combination and method of producing the concrete pipe joint to improve the seal of the concrete pipe joint cooperatively formed between adjacent oval concrete pipes.

2. Description of the Prior Art

Numerous efforts have been made to provide a pipe connection comprising a penetrating pipe and a receiving pipe. Various retaining rings or sealing rings are employed which extend into the inner side of the receiving pipe ending a short distance from the free end of the pipe wherein the diameter of the retaining ring is substantially equal to the inner diameter of the receiving pipe.

Such pipe connections are known but present particular disadvantages. The retaining ring for instance can be easily damaged when the pipe with ring strikes the surface of the ground at a high angle. Moreover the ring, in case of such a fall, may be slightly displaced whereby the clamping effect is impaired.

Typically, pipes used to carry or transport large volumes of water or other fluid include an enlarged bell end to receive the next adjacent round pipe. However the terrain and water table in some areas does not permit use of round pipes with enlarged bell joints for sufficient volumes of water or other fluid to be transported. In addition, the use of oval pipes also increases the earth cover in any given situs. Thus oval pipes with symmetrical and smoother outer periphery without a bell protrusion have been developed. Unfortunately alignment and fitting of such oval pipes is relatively difficult. Moreover the prior art is generally deficient of effective sealing gaskets.

U.S. Pat. No. 4,538,822 discloses a seal gasket specifically configured to seal the joint between adjacent oval concrete pipes. Each oval concrete pipe includes a male and female joint member formed on opposite ends thereof to operatively engage the corresponding joint member formed on the next adjacent oval concrete pipe; while, the seal gasket comprises an annular substantially resilient member including a base member disposed to engage the male joint member having a retainer element extending inwardly from the inner surface thereof to engage the inner end of the male joint member and a plurality of sealing elements extending outwardly from the outer surface of the base member to engage the female joint member such that as adjacent oval concrete pipes are placed in operative relation relative to each other the retainer element retains the seal gasket therebetween as the plurality of sealing elements are compressed therebetween to seal the joint between the adjacent oval concrete pipes.

U.S. Pat. No. 4,279,425 shows a dual seal gasket specifically configured to seal the joint between adjacent concrete pipes comprising an annular substantially resilient member including a first retainer element disposed on the outer surface of one of the adjacent concrete pipes having its longitudinal axis substantially parallel to the longitudinal axis of the adjacent concrete pipes, a first sealing element including an upper and lower enlarged truncated compressible members interconnected by a reduced intermediate member extending inwardly from the first retainer element and substantially perpendicular thereto and a second sealing element including a compressible body having a pair of compressible finger members extending outwardly therefrom in a substantially V-shaped configuration having its longitudinal axis substantially parallel to the longitudinal axis of the first retainer element and substantially perpendicular to the longitudinal axis of the first sealing element such that as the adjacent concrete pipes are placed in operative relation relative to each other the first retainer element retains the dual seal gasket therebetween as the first and second sealing elements are compressed therebetween to seal the joint between the adjacent concrete pipes.

U.S. Pat. No. 4,565,381 relates to a self aligning concrete pipe to improve the seal of the joint cooperatively formed between adjacent concrete pipes wherein each concrete pipe includes a male and female joint member formed on opposite ends thereof to operatively engage the corresponding joint member formed on the next adjacent concrete pipe to form the joint therebetween. The male joint member includes a tongue element of predetermined peripheral configuration extending outwardly from the concrete pipe having a resilient seal attached thereto offset inwardly from the outer end thereof; while, the female joint member includes a groove element extending inwardly from the opposite end of the concrete pipe comprising an initial alignment stage, intermediate alignment stage and final seat recess stage. The initial alignment stage includes an axial alignment camming surface of decreasing diameter having a linear dimension equal to or less than the inward offset of the resilient seal from the outer end of the tongue element and a horizontal and vertical alignment step having an inwardly inclined surface. The intermediate alignment stage includes an axial alignment camming surface of decreasing diameter and a horizontal and vertical alignment step having an inwardly inclined surface and the final stage includes a camming surface of decreasing diameter such that as adjacent concrete pipes are assembled the tongue element engages the initial and intermediate alignment stages to horizontally vertically and axially align the adjacent concrete pipes permitting the tongue element to enter the final seat recess stage to form the joint therebetween.

U.S. Pat. No. 4,686,756 teaches the method of producing the self-aligning concrete pipe disclosed and described in U.S. Pat. No. 4,565,381.

U.S. Pat. No. 2,882,073 shows a bell and spigot joint between sections of concrete pipe wherein the spigot has stretched thereon an endless rubber ring acting as a gasket between the bell and spigot. The ring includes an inwardly extending flange at the forward end portion abutting a forwardly facing shoulder on the spigot and a single internal annular rib disposed rearwardly of the geometrical center of the cross section of the ring serving as a fulcrum tending to expand the rear portion of the ring outwardly against the bell. The rear end portion of the ring includes a groove defining rearwardly extending flanges at the inside and outside of the ring engageable with the spigot and bell forwardly of the internal rib with the internal and external surfaces of the ring concave between each rib and each of the end portions with the contact surfaces between the ribs and sections being positioned entirely opposite a concavity in the respective opposite ring surface.

U.S. Pat. No. 3,048,415 describes a pipe joint assembly comprising cooperable male and female pipe members wherein the male member includes an outer annular surface and the female member includes an inner annular surface defining an annular space with the annular surface of the male member when the joint is assembled. The annular surface of the male member includes a relatively wide and shallow annular groove formed therein with the bottom surface being substantially flat and a preformed annular self-supporting gasket of flexible resilient material having a solid cross-section. The gasket comprises an annular base portion with a radial height generally the same as the depth of the groove wherein the base portion includes a flat bottom surface and sides respectively joining the bottom surface and perpendicular thereto and two substantially identical annular wedge portions each having a generally triangular cross-section integrally joined to the base portion and extending radially outwardly therefrom. The wedge portions are axially joined end-to-end extending axially across the base portion and respectively joining the sides thereof with each wedge portion having one side facing the front end of the male member and inclined outwardly and rearwardly with the other side facing the rear end of the male member and inclined outwardly and forwardly.

U.S. Pat. No. 3,046,028 shows an elastomeric gasket with a generally cylindrical body portion, a small plurality of ribs encircling the outer surface of the body portion in parallel relation. The major portion of the inner surface of the gasket extends inwardly from one edge of the gasket configured to rest on a flat surface and substantially in contact therewith. Each of the ribs has tapered outwardly with all of the ribs being adapted to be flattened toward the edge of the gasket with an enclosed opening in the body portion between each two ribs and a separate enclosed opening in the body portion below the base of each rib.

Additional examples of the prior art are found in: U.S. Pat. Nos. 2,809,853; 2,832,614; 2,999,699; 3,315,971; 3,414,273; 3,573,871; 3,575,430; 3,656,771; 3,520,541; 3,515,396; 3,675,685; 3,857,589; 4,084,828; and 4,174,859; together with German Pat. Nos. 1,129,344 and 2,402,022; Great Britain Pat. No. 1,080,816 and French Pat. No. 1,335,842.

SUMMARY OF THE INVENTION

The present invention relates to a sealing gasket and self-aligning oval concrete pipe combination and a method of producing the self-aligning oval concrete pipe to improve the sealing of the joint cooperatively formed between adjacent self-aligning oval concrete pipes.

The sealing gasket comprises a retainer element configured to engage the inner end of one of the adjacent oval concrete pipes to prevent the sealing gasket from slipping into the space between the adjacent oval concrete pipes and a sealing element including a flexible resilient sealing member extending outwardly from a base member to seal the joint cooperatively formed between adjacent self-aligning oval concrete pipes when assembled; while each oval concrete pipe includes a male and female joint member formed on opposite ends thereof to operatively engage the corresponding joint member formed on the next adjacent oval concrete pipe.

The male and female joint members each include corresponding shaped portions to facilitate the alignment and positioning of adjacent oval concrete pipes during assembly.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a sealing gasket and self-aligning oval concrete pipe combination generally indicated as 10 and a method of producing the self-aligning oval concrete pipe generally indicated as 12 to improve the sealing of the joint cooperatively formed between adjacent self-aligning oval concrete pipes 12 to dramatically reduce to flow or leakage of contaminated storm water into the ground and aquifer. More specifically, Applicant has invented a means of producing oval cement pipes of significantly closer production tolerances and alignment of corresponding parts on opposite ends of each oval concrete pipe.

Figure 2:
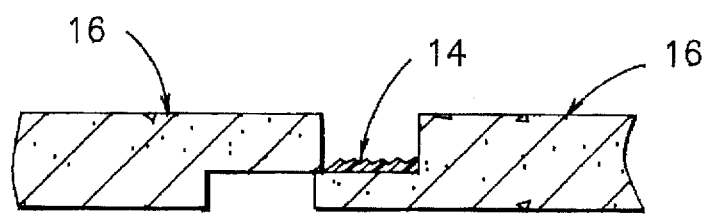
FIG. 2 is an example of prior art seal and concrete pipes.
Figure 3:
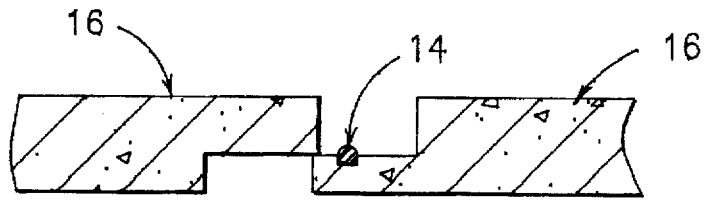
FIG. 3 is another example of prior art seal and concrete pipes.

The prior art is significantly deficient in several aspects. For example as shown in FIGS. 2 and 3, the sealing elements generally indicated as 14 are often dislodged or multilated during assembly by a portion of the next adjacent concrete pipe generally indicated as 16.

Figure 4:
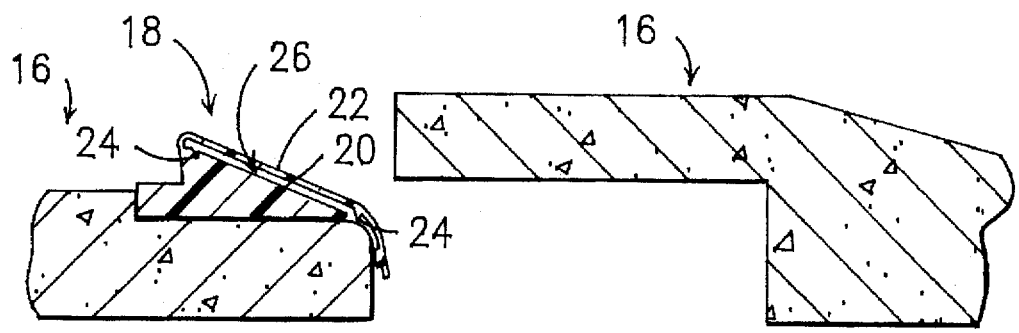
FIGS. 4 and 5 are examples of still another prior art seal and concrete pipes.
Figure 5:
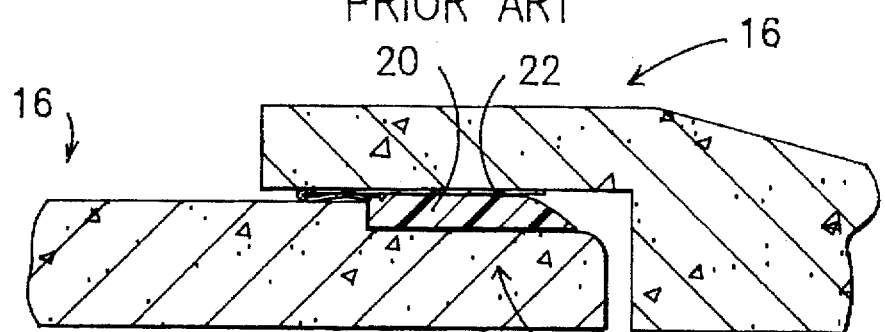

FIGS. 4 and 5 show another example of the prior art. The sealing element generally indicated as 18 comprises a sliding seal including a supporting compression section 20 and a thin sliding flap 22 having a plurality of elements each indicated as 24 formed thereon between which lubricant 26 is applied when the seal 18 is manufactured and packed at the factory. When the adjacent concrete pipes 16 are fitted together the edge of the bell first encounters the thin sliding flap 22 which then slides with very low friction towards the supporting compression section 20.

This prior art along with the other examples known to Applicant do not adequately solve the problem of consistently creating a water tight seal. In addition to the problem of sealing the joint when assembling oval or elliptical concrete pipe 12, adjacent oval or elliptical concrete pipes 12 are often not sufficiently axially aligned to permit proper assembly. Thus there is a clear need for a combination sealing gasket and self-aligning, close tolerance, oval concrete pipe combination capable of reliably forming a reliable water tight seal.

Figure 1:
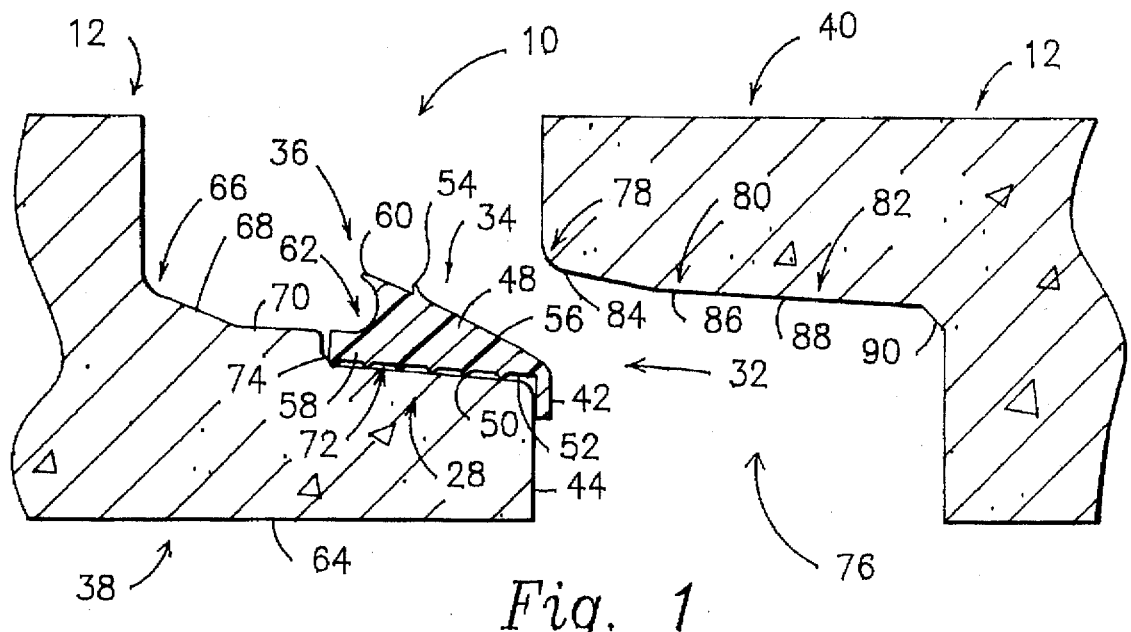
FIG. 1 is a cross-sectional side view of a partial pipe line of the present invention during assembly.
Figure 6:
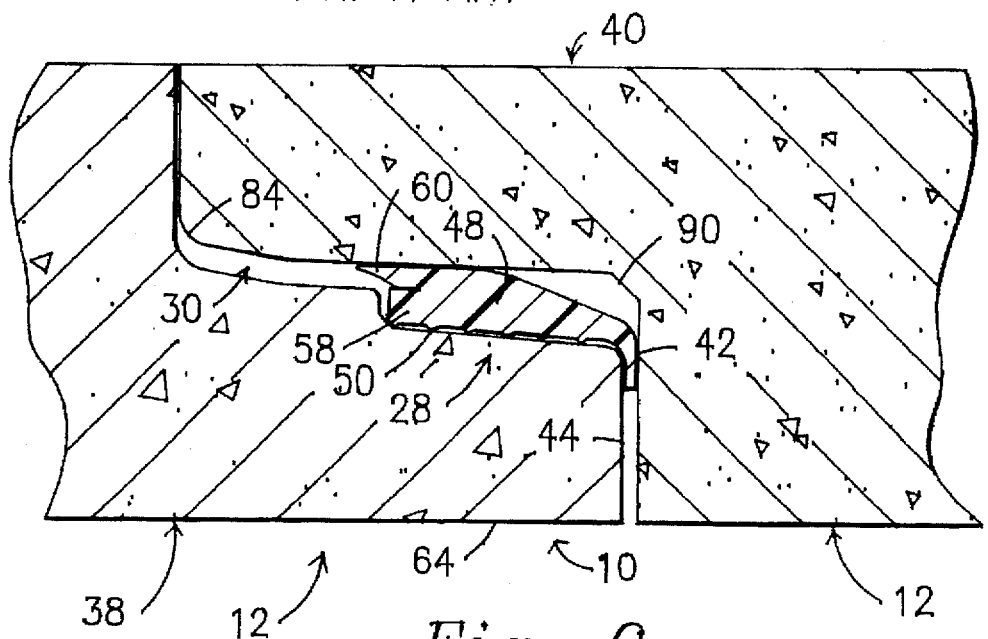
FIG. 6 is a cross-sectional side view of adjacent oval concrete pipes forming the joint therebetween and the sealing gasket of the present invention.

As shown in FIGS. 1 and 6, the sealing gasket of the present invention generally indicated as 28 is specifically configured to seal the joint 30 between the adjacent oval concrete pipes 12. More specifically, the sealing gasket 28 comprises a retainer element, a base member and sealing element generally indicated as 32, 34 and 36 respectively. Each oval concrete pipe 12 includes a male and female joint member generally indicated as 38 and 40 respectively formed on opposite ends thereof to operatively engage the corresponding joint member 40 or 38 formed on the next adjacent oval concrete pipe 12.

As shown in FIGS. 1 and 6, the retainer element 32 comprises an annular retainer member 42 configured to engage the inner end 44 of the male joint member 40 of one of the adjacent oval concrete pipes 12. When so disposed the engagement therebetween prevents the sealing gasket 28 from slipping into the space 46 between the adjacent oval concrete pipes 12 during assembly.

As shown in FIGS. 1 and 6, the base member 34 comprises a substantially triangular-shaped compressible element 48 having a plurality of compression ribs each indicated as 50 formed on the lower surface 52 thereof and at least one lubricant rib 54 formed on the inclined surface 56 thereof and inner rectilinear portion 58.

As shown in FIGS. 1 and 6, the sealing element 36 comprises a flexible resilient sealing member 60 extending outwardly from the base member 34 and cooperatively forming a concave recess 62 therewith.

As previously described, each oval concrete pipe 12 includes a male and female joint member 38 and 40 respectively formed on the opposite ends thereof to operatively engage the corresponding joint member 40/38 formed on the next adjacent oval concrete pipe 12 to form the joint 30 therebetween.

The male joint member 38 comprises a tongue element 64 extending outwardly from the oval concrete pipe 12. The tongue element 64 comprises an inner concave surface 66, first intermediate inclined surface 68 of approximately 20 degrees from the horizontal plane, second intermediate inclined surface 70 of approximately 4 degrees from the horizontal plane and outer sealing gasket recess 72 having a chamfer 74 formed on the inner portion thereof. The depth of the outer sealing gasket recess 72 is substantially equal to the height of inner rectilinear portion 58.

The female joint member 40 includes a groove element generally indicated as 76 extending inwardly from the opposite end of the oval concrete pipe 12. The groove element 76 includes an initial alignment portion, intermediate alignment portion and final sealing portion generally indicated as 78, 80 and 82 respectively.

The initial alignment portion 78 comprises an outer convex arcuate leading camming surface 84. The intermediate alignment portion 80 comprises an intermediate inclined alignment surface 86 of approximately 20 degrees from the horizontal plane. The final sealing portion 82 comprises an inner inclined surface 88 of approximately 4 degrees from the horizontal plane terminating in a chamfer 90.

In operation the sealing gasket 28 is placed in the outer sealing gasket recess 72 of one of the adjacent oval concrete pipes 12 such that the annular retainer member 42 engages the inner end 44 of the male joint member 40 of the adjacent oval concrete pipes 12. Then the second adjacent oval concrete pipe 12 is moved in coaxial relationship relative to the first adjacent oval concrete pipe 12 to initially start the formation of the joint 30. The inclined surface 56 is lubricated with the lubricant ribs 54 acting to create a plurality of lubricated sections on each side thereof on the inclined surface 56 to retain lubricant along substantially the entire length thereof to more evenly distribute the lubricant. As the two adjacent oval concrete pipes 12 are moved inwardly or together relative to each other, the compressible sealing element 48 and compression ribs 50 are compressed as best shown in FIG. 6. The sealing element 36 extends into and forms a seal in joint 30 to act as a check valve. As a result, the improved sealing gasket 28 is capable of preventing liquid flow through the joint 30 at pressures of at least ten (10 p.s.i.) pounds per square inch. Such sealing integrity has not been previously known. The lubricant may also be an adhesive to secure the sealing gasket 28 within joint 30 between adjacent oval concrete pipes 12.

As previously set forth, it is not uncommon that when assembling adjacent oval concrete pipes 12 at the site, the sealing gasket 28 engages the next adjacent oval concrete pipe 12 causing the sealing gasket 28 to snag or to be mutilated. The structure and configuration of the instant invention virtually avoids this inherent problem.

In assembling at the site, adjacent oval concrete pipes 12 are moved in coaxial relationship relative to each other such that the outer end of the tongue element 64 and sealing gasket 28 enters the intermediate alignment portion 80 causing engagement with the outer arcuate leading camming surface 84 to axially align the oval concrete pipes 12 relative to each other. The tongue element 64 and sealing gasket 28 then engages the inner inclined surface 88 such that the predetermined corresponding configurations causes the adjacent oval concrete pipes 12 to further align axially horizontally and vertically relative to each other to seal the joint 30 therebetween as best shown in FIG. 6.

Figure 7:
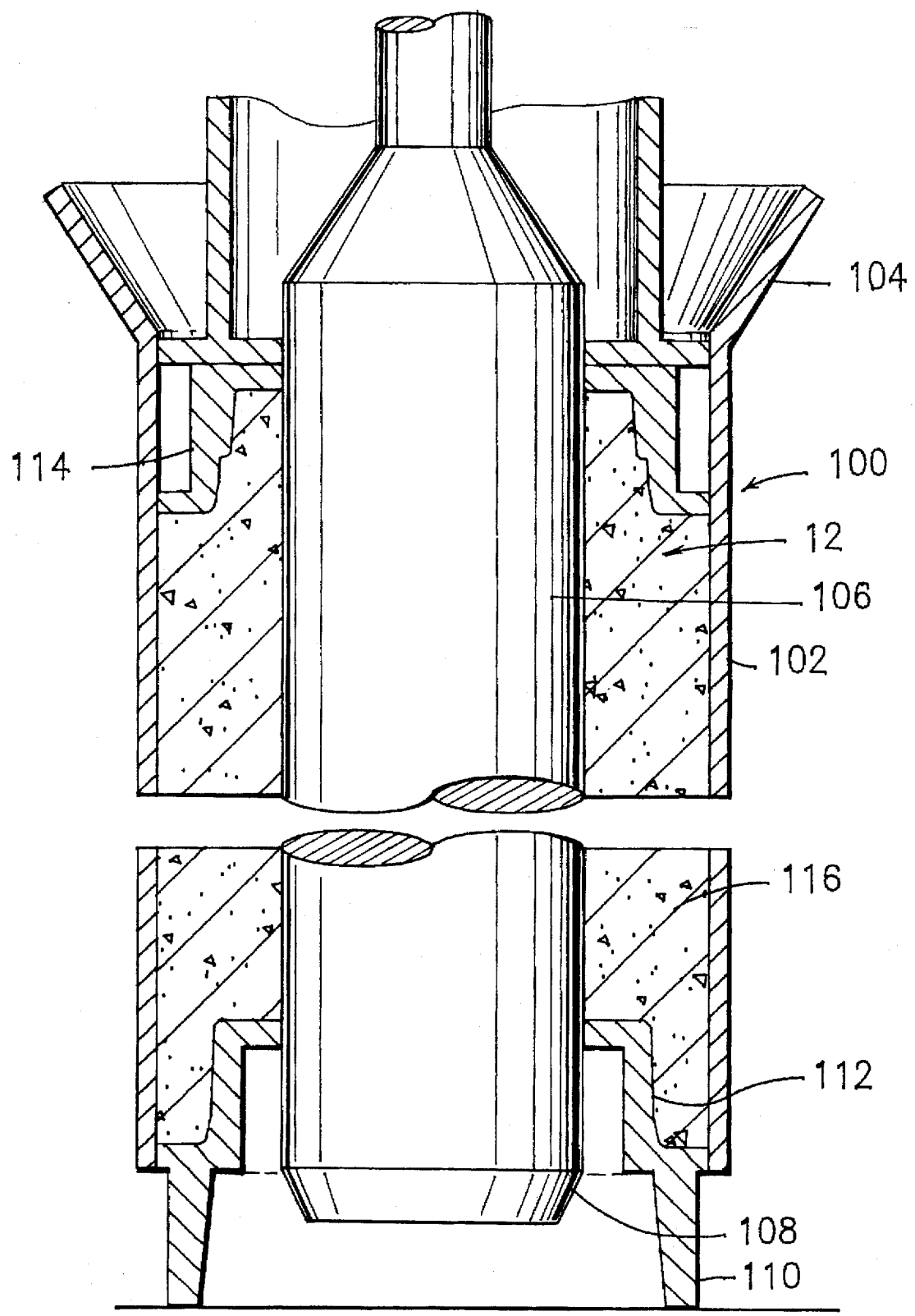
FIG. 7 is a cross-sectional side view of the mold including the outer female jacket and inner male core concentrically disposed therein in combination with the first and second pallets forming the oval concrete pipe of the present invention.

The manufacture of the unique structure is best understood with reference to FIG. 7. The self-aligning oval concrete pipe 12 as previously described is produced within a mold generally indicated as 100 which comprises a substantially vertical outer female jacket 102 including a funnel-like portion 104 formed on the upper portion thereof and a substantially vertical inner male core 106 comprising a hollow body having a truncated cone bottom 108 properly centered within the substantially vertical outer female jacket 102. A saddle 110 supports and centers the bottom or second pallet 112 of obverse configuration to the groove element 76 to form the female joint member 40. The upper or first pallet 114 of obverse configuration to the tongue element 64 to form the male joint member 38 is pressed down upon a concrete mass 116 to form the oval concrete pipe 12. Disposed between the substantially vertical outer female jacket 102 and the substantially vertical inner male core 106 may be a reinforcing wire cage (not shown).

In production, the concrete 116 is poured into the space between the substantially vertical inner male core 106 and substantially vertical outer female jacket 102 and vibrated into place by vibrating mechanisms (not shown) on both the substantially vertical inner male core 106 and substantially vertical outer female jacket 102. Specific details of such processes are shown in prior art such as in U.S. Pat. No. 3,584,356.

Thus through the combination of these unique structural elements, applicant has invented a self-aligning oval concrete pipe and method for producing such oval concrete pipes particularly useful in assembling oval concrete pipe lines capable of aligning in both the horizontal and vertical directions as well as axially, moreover the specific configuration protects sealing gaskets during assembly.

It will thus be seen that the object set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A sealing gasket for use in a pipe line formed by a plurality of concrete pipes wherein each concrete pipe comprises a male joint member formed on one end thereof including a tongue element having an outer longitudinal surface with a sealing gasket recess formed therein to receive a portion of said sealing gasket and a female joint member formed on the opposite end of the concrete pipe including a groove member with an inner longitudinal surface such that when the pipe line is formed the male joint member and the female joint member of adjacent concrete pipes cooperatively form a joint therebetween wherein the outer longitudinal surface of the tongue element and the inner longitudinal surface of the groove member of adjacent concrete pipes cooperatively form a longitudinally disposed space therebetween adjacent the sealing gasket recess, said sealing gasket comprises a base member including an axial inner portion having a lower surface at least partially disposed in said sealing gasket recess having a compressible portion extending upwardly therefrom into the longitudinally disposed space, said compressible portion including an upper surface inclined relative to said lower surface, a sealing element comprising a flexible resilient sealing member including an axial outer end having an upper surface extending outwardly from said compressible portion in spaced relationship relative to said inner portion to cooperatively form a concave recess therewith having an inner surface when uncompressed and to extend into the longitudinally disposed space formed between adjacent concrete pipes when compressed wherein said outer end of said flexible resilient sealing member extends beyond said inner portion exposing a portion of said inner surface wherein said flexible resilient sealing member engages said inner portion of said base member when said flexible resilient sealing member is compressed wherein said inner surface of said recess forms a seam wherein said outer end of said flexible resilient member and said inner portion of said base member each extends beyond said seam to expose opposite ends of said inner surface and a retainer element formed on said base member comprising an annular retainer member configured to engage the end of the male joint member such that any debris or fluid infiltrating between the outer end of the female joint member and the end of the male joint member acts against said exposed inner surface to force said upper surface of said flexible resilient sealing member against the inner longitudinal surface of the female joint member and a portion of said inner end of said inner portion against the inner longitudinal surface of the male joint member to prevent infiltration through the longitudinally disposed space into the interior of adjacent concrete pipes said base member further includes at least one lubricant rib formed on said upper surface to cooperatively form a pocket therebetween disposed adjacent said outer end of said flexible resilient sealing member to retain a lubricant within said pocket such that as adjacent concrete pipes are assembled into a pipe line the lubricant rib is compressed thereby discharging the lubricant from said pocket to aid in the alignment of adjacent concrete pipes during assembly of the pipe line.

2. The sealing gasket of claim 1 further including a plurality of compression ribs formed on said lower surface to cushion adjacent portions of adjacent concrete pipes when assembled in the pipe drain.

* * * * *